United States Patent [19]

Pommer et al.

[11] 3,911,134
[45] Oct. 7, 1975

[54] FUNGICIDAL WOOD PROTECTANT COMPOSITIONS

[75] Inventors: Ernst-Heinrich Pommer, Limburgerhof; Wolfgang Reuther, Ziegelhausen; Reimer Goettsche, Baden-Baden; Heinrich Poppen, Sinzheim, near Baden-Baden, all of Germany

[73] Assignee: BASF Aktiengesellschaft, Ludwigshafen (Rhine), Germany

[22] Filed: July 12, 1974

[21] Appl. No.: 488,001

[30] Foreign Application Priority Data
July 17, 1973 Germany............................ 2336290

[52] U.S. Cl. .................. 424/274; 424/324; 424/325
[51] Int. Cl.² ... A01N 9/20; A01N 9/22; A01N 9/24
[58] Field of Search..................... 424/274, 324, 325

[56] References Cited
OTHER PUBLICATIONS

Chemical Abstracts, 73: P86917w, (1970).
Chemical Abstracts, 62: 3973b, (1965).

*Primary Examiner*—Albert T. Meyers
*Assistant Examiner*—Leonard Schenkman
*Attorney, Agent, or Firm*—Johnston, Keil, Thompson & Shurtleff

[57] ABSTRACT

A fungicide and process for the protection of wood requiring a mixture of (a) the aluminum salt of N-nitroso-N-cyclohexylhydroxylamine, and (b) N-fluorodichloromethylthiophthalimide or N,N'-dimethyl-N'-phenyl-(N'-fluorodichloromethylthio)-sulfamide in a weight ratio of (a):(b) of 1:1 to 8:1, preferably 1:1 to 4:1. This mixture is useful in oily wood protectants or in paints as well as by direct impregnation with a suitable solvent.

2 Claims, No Drawings

FUNGICIDAL WOOD PROTECTANT COMPOSITIONS

The present invention relates to a fungicide containing a mixture of different active ingredients.

It is known from German Pat. No. 1,024,743 to use salts of N-nitroso-N-cyclohexylamine (NCH) for protecting wood from attack by wood-discoloring fungi such as Pullularia pullulans and Sclerophoma pityophila. However, a disadvantage of this method is that relatively high rates of application are necessary to protect the wood. It is also known to use N-fluorodichloromethylthiophthalimide or N,N-dimethyl-N'-phenyl-(N'-fluorodichloromethylthio)sulfamide to combat wood-discoloring fungi. These substances must also be used in large quantities to achieve adequate protection.

We have now found that a mixture of
a. the aluminum salt of NCH and
b. N-fluorodichloromethylthiophthalimide or N,N-dimethyl-N'-phenyl-(N'-fluorodichloromethylthio)sulfamide has a fungicidal action which is greater than the action of the individual active ingredients, i.e. the ingredients have a mutual synergistic effect. These ingredients may be mixed in a wide range of proportions. For example, a ratio of aluminum salt of NCH to N-fluorodichloromethylthiophthalimide or N,N-dimethyl-N'-phenyl-(N'-fluorodichloromethylthio)sulfamide of from 1:1 to 8:1 and preferably from 2:1 to 4:1, by weight, has been found to give excellent protection from wood-discoloring fungi. A liquid oil wood protectant applied at the rate of from 100 to 200 cm$^3$/m$^2$ of wood surface may contain up to 4 percent of aluminum salt of NCH and up to 1 percent of N-fluorodichloromethylthiophthalimide or N,N-dimethyl-N'-phenyl-(N'-fluorodichloromethylthio)sulfamide, by weight. An optimum mixture contains 2 percent of aluminum salt of NCH and 0.5 percent of N-fluorodichloromethylthiophthalimide or N,N-dimethyl-N'-phenyl-(N'-fluorodichloromethylthio) sulfamide, by weight of the total weight of wood protectant.

The fungicidal mixtures of the invention have, in addition to their fungicidal action, an insecticidal effect with respect to wood-destroying insects. The following wood-discoloring fungi and soft-rot and mold fungi may be controlled with the agents of the invention: Merulius lacrimans, Coniophora cerebella, Lentinus lepideus, Poria vaporaria, Linzites trabea, Paxillus panuoides; Pullularia pullulans, Aspergillus niger, Bispora effusa, Stachybotrys atra, Trichoderma viride, Paecilomyces variotii, Cladosporium herbarum, Sclerophoma pityophila, Chaetomium globosum, Hormiscium spec., Stemphylium spec., Alternaria spec., Phoma violacea.

The mixtures may be used as fungicidally active ingredients of oily wood protectants. They are used for treatment of wood, for example by impregnation or brush application. The mixtures may also be used as fungicides in paints.

EXAMPLE 1

For the purpose of preparing an oily wood protectant containing 2.5 percent of active mixture (ratio 4:1), 0.5 part (all parts are by weight) of N-fluorodichloromethylthiophthalimide or N,N-dimethyl-N'-phenyl-(N'-fluorodichloromethylthio)sulfamide is dissolved in 55 parts of a high-aromatics petroleum fraction with slight warming. There are then added 10 parts of an alkyl resin and 2 parts of the aluminum salt of NCH and the whole is made up to 100 parts at room temperature with white spirit. Similarly, oily wood protectants are prepared in which the active mixtures have a ratio of 1:1 to 6:1.

In order to prepare water-repellent impregnating paints, water repellents may be added to the oily wood protectant mixtures. Suitable substances are for example zinc stearate, aluminum stearate and waxes. The mixtures may be colored by adding inorganic or organic pigments thereto.

For the protection of wood from fungus attack, usually from 50 to 200 ml of the oily wood protectant described in this Example are applied, per m$^2$ of wood surface, by brush application, spraying or dipping. The method of application used depends for example on whether planed or unplaned wood is to be protected and on the amount of protection required. The amount of active mixture required to protect the wood is, per m$^2$ of wood surface, from 1 to 10 and preferably from 2 to 5 g and the preferred amount is 2.5 g (ratio 4:1) or 3 g (ratio 2:1), calculated as mixture of solid active ingredients ignoring the contents of solvent, pigment and binder.

The following Example illustrates the very good fungicidal action of the agents of the invention.

EXAMPLE 2

Using a method similar to that described by Butin "Verscharfte Mundener Streifenmethode", method of evaluating the anti-blueing properties of oily primers (Farbe und Lack 71, No. 5, pp. 373–374, 1965), the effectiveness of the mixtures described in Example 1 against the blue-staining fungi Sclerophoma pityophila and Pullularia pullulans was tested. Comparative mixtures used were those containing 2 percent of the aluminum salt of NCH or 2 percent of N-fluorodichloromethylthiophthalimide or 2 percent of N,N-dimethyl-N'-phenyl-(N'-fluorodichloromethylthio)sulfate used singly. The mixtures were composed of the following ingredients:

2 percent (all percentages are by weight) of aluminum salt of NCH or N-fluorodichloromethylthiophthalimide or N,N-dimethyl-N'-phenyl(N'-fluorodichloromethylthio)sulfamide, 10 percent of an oil-modified alkyl resin, 30 percent of an aliphatics-containing petroleum fraction and 58 percent of an aromatics-containing petroleum fraction.

The control surfaces (no active ingredient applied thereto) were coated with linseed oil varnish.

The tests were carried out on boards of pine sapwood which were treated over one half thereof either with one application of 50 g or 100 g or with two applications of 2 × 100 g of wood protectant mixture. The control surfaces were coated with the same weight of linseed oil varnish. Following application of a colored alkyd resin paint, the boards were weathered for 6 months in the open air and then installed in Kolle culture flasks for examination for fungal attack. At the end of the test period, the control surfaces of the test boards showed blue staining to an extent of 90 percent on average, this being due to the growth of Sclerophoma pityophila and Pullularia pullulans. The results of the tests are listed in the following Table. The efficiency of the active mixtures and the active ingredients used separately was determined according to the Abbot formula:

$$\text{efficiency in \%} = \frac{\text{growth on control minus growth in test}}{\text{growth on control}} \times 100$$

TABLE

| Mixture | Appln. rate (g/m²) of pinewood surface | Appln. rate of active ingredients (g/m² of pinewood surface) A + B | | % of wood surface blue-stained | Effic. of mixture in % | Effic. of separate active ingred. in % | Sum of effic's of sep. active ingred in % |
|---|---|---|---|---|---|---|---|
| Al salt of NCH (ingred. A) plus | 100 | 2 | 2 | 0 | 100 | | 84 |
| N-fluorodichloromethylthiophthalimide (ingred. B) | 100 | 2 | 1 | 0 | 100 | | 73 |
| | 100 | 2 | 0.5 | 20 | 78 | | 39 |
| Al salt of NCH (ingred. A) | 100 | 2 | | 75 | | 17 | |
| Ingred. B | 100 | | 2 | 30 | | 67 | |
| | 50 | | 1 | 40 | | 56 | |
| | 25 | | 0.5 | 70 | | 22 | |
| Ingred. A plus | 100 | $\frac{A}{2}$ | + $\frac{C}{2}$ | 0 | 100 | | 92 |
| N,N-dimethyl-N'-phenyl-(N'-fluorodichloromethylthio)sulfamide (ingred. C) | 100 | 2 | 1 | 0 | 100 | | 63 |
| | 100 | 2 | 0.5 | 30 | 67 | | 50 |
| Ingred. C | 100 | | 2 | 30 | | 67 | |
| | 50 | | 1 | 50 | | 44 | |
| | 25 | | 0.5 | 60 | | 33 | |
| Linseed oil varnish with no active ingredients | 100 | | | 90 | | | |

We claim:

1. A wood protectant composition comprising a fungicidal mixture of
   a. the aluminum salt of N-nitroso-N-cyclohexylhydroxyl-amine, and
   b. N-fluorodichloromethylthiophthalimide or N,N-dimethyl-N'-phenyl-(N'-fluorodichloromethylthio) sulfamide in a weight ratio of (a):(b) of 1:1 to 4:1.

2. A process for the protection of wood from fungal damage which comprises treating the wood with a fungicidal amount of a mixture of
   a. the aluminum salt of N-nitroso-N-cyclohexylhydroxylamine, and
   b. N-fluorodichloromethylthiophthalimide or N,N-dimethyl-N'-phenyl-(N'-fluorodichloromethylthio) sulfamide in a weight ratio of (a):(b) of 1:1 to 4:1.

* * * * *